United States Patent [19]
Van Hove

[11] 3,857,205
[45] Dec. 31, 1974

[54] DEVICE FOR THE FEEDING OF OPTICAL GLASSES, PARTICULARLY FOR SPECTACLES, TO A GLASS-TREATING MACHINE AND FOR THE REMOVAL OF SAID GLASSES THEREFROM

[75] Inventor: Camille Cesar Van Hove, Kapellen, Belgium

[73] Assignee: Buchmann Optical Industries, Kapellen, Belgium

[22] Filed: Dec. 12, 1973

[21] Appl. No.: 423,892

[30] Foreign Application Priority Data
Dec. 12, 1972 Belgium .............................. 125232

[52] U.S. Cl. .................................... 51/134, 29/38 c
[51] Int. Cl. ............................................. B24b 5/00
[58] Field of Search ........ 51/53, 108, 134; 29/38 A, 29/38 C, 39

[56] References Cited
UNITED STATES PATENTS
1,518,971  12/1924  Edwards ............................ 51/108 R
2,377,992  6/1945  Carlson ................................ 51/134
3,140,567  7/1964  Soong et al. ...................... 51/108 R
3,177,773  4/1965  Kehr et al. .......................... 51/53 X
3,771,509  11/1973  Murchie ................................ 51/134

Primary Examiner—Othell M. Simpson
Attorney, Agent, or Firm—Wigman & Cohen

[57] ABSTRACT

A device for the feeding of optical glasses to a glass-treating machine is described, which comprises a movable support provided with openings through which the glass-treating machine head can pass partly at least, a plurality of glass holders which bear with the lower part thereof at least in the support openings, and means for moving the support intermittently in such a way that each support opening can come in sucession between the head and tool of the glass-treating machine.

8 Claims, 3 Drawing Figures

FIG.1
FIG.2
FIG.3
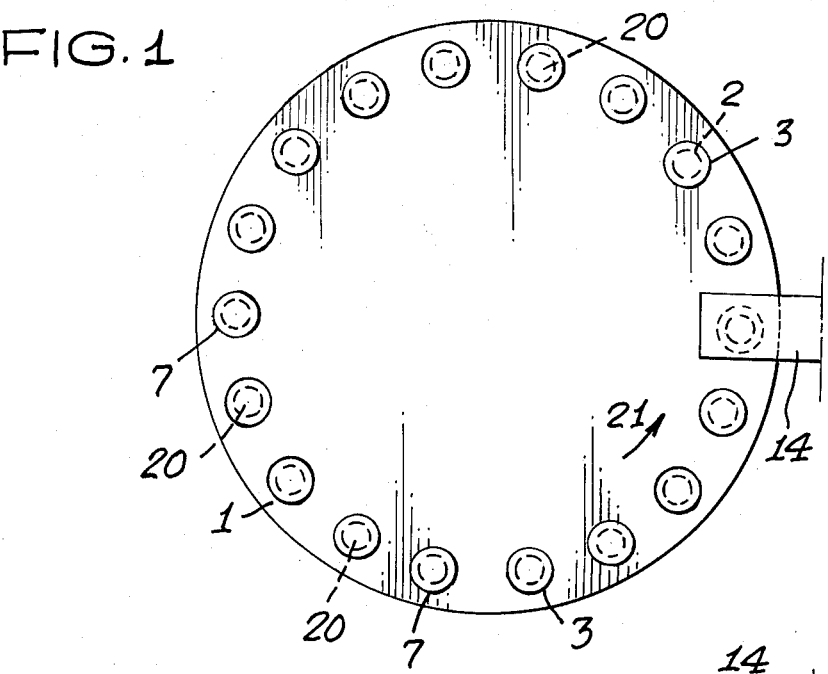
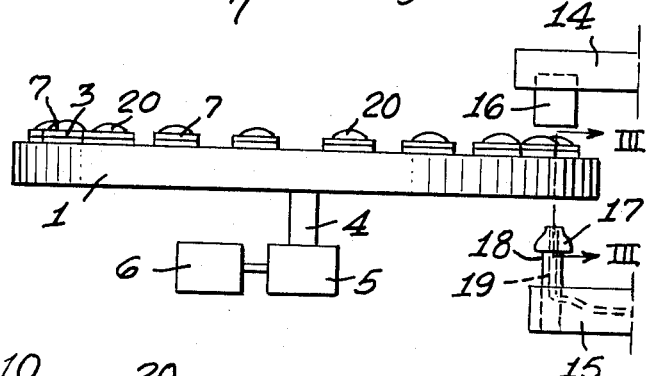
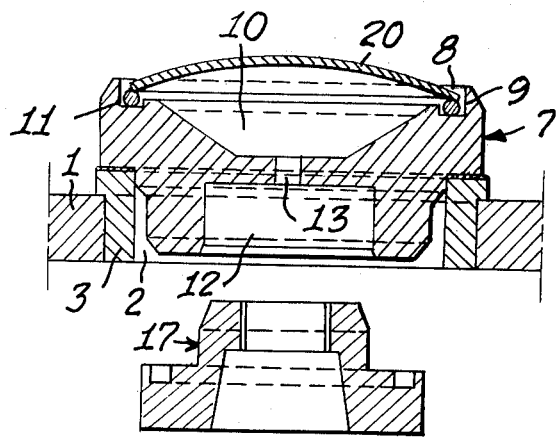

DEVICE FOR THE FEEDING OF OPTICAL GLASSES, PARTICULARLY FOR SPECTACLES, TO A GLASS-TREATING MACHINE AND FOR THE REMOVAL OF SAID GLASSES THEREFROM

The invention pertains to a device for the feeding of optical glasses, particularly for spectacles, to a glass-treating machine and for the removal of said glasses therefrom, said machine comprising a tool, means for rotating said tool, a head lying thereunder which is movable up and down and rotatable about a vertical axis, and means for moving said head to and away from said tool, with a glass holder and means to bring a glass in said holder between said head and tool and away from between said head and tool.

The tool can then be a diamond crown or ball while the machine can be a roughing machine or a smoothing machine.

The tool is rotatably arranged under a determined angle while the glass surface comes also rotatably against said tool. There is thus obtained a spherical surface. The glass has to be located before the treatment in a glass holder which should occur very accurately, notably to always obtain the same thickness for the various glasses, to prevent a prismatic action, to obtain accurate areas, to minimize glass breaking and to prevent stoppages in the production.

Known devices for the feeding of glasses to a machine for treating spectacle glasses and for removing the glasses therefrom comprise one holder which is mounted on the vertically-movable and rotatable head. Said devices also comprise a slider which is arranged next to the glass holder in the lowest position. The glasses to be treated or worked on are taken with a suction cup and brought to said slider. By the treatment end, thus when the holder is down again, the new glass is moved over the slider while the treated glass lying in the holder is pushed somewhat upward. The new glass thus pushes with the edge thereof the glass lying in the holder outwards and locates itself in the glass holder. With such devices, the accurate adjustment takes relatively much time as a very high accuracy is required. Moreover said devices cannot be used with concave glasses which are difficult to move with a slider.

There are actually known devices whereby the glasses are arranged directly with a suction cup inside the holder but such devices are not very work-safe and are very complex mechanically.

With some devices, the glasses are brought in the holder, instead of with suction cups, by means of a conveying belt, but such devices have also the same drawbacks.

In all of such known devices, the treatment or working has thus to be stopped when locating a new glass in the holder or removing said glass from the holder, in such a way that the production rate is rather low.

To each machine must also be associated at least one operator for locating the glasses inside the holder and for removing same from said holder. When a glass breaks, it should also first be removed from the holder before a new glass can be located. During this time the treatment machine cannot work either. To obviate said drawbacks, there has already been designed a device for the feeding of glasses to a glass-treating machine and for removing the glasses therefrom which comprises a turntable which brings the glasses laid on said table to a determined position below the diamond tool of the treatment machine. Such feeding and removing machines can also only be used with a glass-treating machine which does not comprise any up-and-down movable head but whereby the tool itself can be moved up and down. Said tool must indeed go down to the glass lying on said table. Due to the relatively heavy weight of the tool, such going down has to occur slowly in such a way that the production rate is correspondingly low. Moreover the glass-treating machines are themselves relatively intricate. The turntable should then also be connected through a mechanical transmission to the treatment machine which thus makes the construction rather more complex and consequently associates a particular feeding and removing device to a particular treatment machine.

The invention has for object to obviate the above drawbacks and to provide a device for the feeding of optical glasses to a glass-treating machine and for the removal of said glasses therefrom with which both convex and concave glasses can be fed very accurately and relatively fast to a glass-treating machine and whereby said treatment-machine can work relatively fast as use can be made of a machine with a tool that does not move and the glass feeding and removal can occur very fast.

For this purpose, the device comprises a movable support provided with openings through which the glass-treating machine head can pass partly at least, a plurality of glass holders which bear with the lower part thereof at least in the support openings, and means for moving the support intermittently in such a way that each support opening can come in succession between the head and tool of the glass-treating machine.

The device thus no more comprises but one holder which is located between the head and tool but a plurality of holders can be brought in succession by the support between the head and tool. The glass can be arranged in the holders and removed therefrom out of the glass-treating machine in such a way that said machine does not have to be stopped therefor. When a holder has been brought by the support between the head and the tool, said head raises the holder out of the support and thus moves said holder towards the tool. After the treatment the head goes back down in such a way that the holder comes again inside the support opening.

In a particular embodiment of the invention, the support is a disk and the means for moving intermittently said support are means for rotating intermittently said disk.

In a remarkable embodiment the number of openings in said support is equal to about 24.

In an advantageous embodiment of the invention, the glass holders are removably located in the support openings.

In an useful embodiment each holder is provided on the lower side thereof with a recess inside which fits a projecting portion of the head of the glass-treating machine.

In a preferred embodiment of the invention the support openings and the holders are round and each holder comprises a portion which fits accurately inside the openings and a portion of larger diameter which lies on the support upper side.

Other details and features of the invention will stand out from the description given below by way of non limitative example and with reference to the accompanying drawings, in which:

FIG. 1 is a top plan view of a device for the feeding of spectacle glasses to a glass-treating machine and for the removal of glasses therefrom according to the invention, whereby a portion of the glass-treating machine has been shown diagrammatically.

FIG. 2 is a side view of the device shown in FIG. 1.

FIG. 3 is a cross-section along line III—III in FIG. 2, on a larger scale.

In the figures, the same reference numerals pertain to similar elements.

The device shown in the drawings comprises a round disk 1 which is provided at a small distance from the circumference thereof with 24 round openings 2 which are equally spaced from one another. Each opening 2 is bounded by a sleeve 3 of aluminum bronze which enters the disk 1 and projects by a thicker collar from said disk upper side. The disk 1 is made fast in the center thereof to a vertical shaft 4 which is driven through a coupling 5 by an electric motor 6.

The device also comprises 24 glass holders 7 of aluminum bronze, that is as many as there are openings 2 in the disk 1.

Each round glass holder 7 comprises a top portion the diameter of which is equal to the outer diameter of the thick collar of the sleeves 3 and thus is larger than the diameter of the disk openings 2. The top outer edge of said top portion is bevelled. In said portion is provided an opening which opens on the upper side and which is comprised of an upper cylindrical portion 8, and U-shaped groove 9 which opens over the circumference of portion 8 on the lower side thereof, and a portion 10 of a trapezium-shaped cross-section which joins that section of portion 8 lying inside the groove 9. Inside the U-shaped groove 9 is arranged a rubber ring 11. Each round glass holder 7 has a middle portion the diameter of which is precisely equal to the diameter of the openings 2 and a lower portion which is connected by a gradual transition to the middle portion and the lower outer edge of which is bevelled over the whole circumference thereof. In the lowermost portion and in the gradual transition between said lowermost portion and the middle portion is provided a cylindrical opening 12 the lowermost end of which widens somewhat. The opening 12 communicates through the opening 8,9,10 with a channel 13. The axis of the channel 13 lies in the extension of the symmetry axis of portions 8 and 10 of the opening in the top portion and of the opening 12 and said axis coincides with the lengthwise axis of the round glass holder 7.

As it is clear from the drawings the device is designed to be used with a spectacle glass-treating machine. Said machine is of known construction and will only be described here as far as it is necessary to understand the operation of the glass feeding and removal device. Said glass-treating machine comprises a top arm 14 which lies above the disk 1 and a bottom arm 15 which lies below the disk 1. On the top arm 14 is mounted a diamond tool 16, for example a diamond crown or ball, said tool being rotatable around an axis lying at an angle to the vertical. Said tool 16 lies exactly opposite that ring-like path of disk 1 where the openings 2 are provided. On the bottom arm 15 is mounted exactly opposite the tool, a head 17 which lies on a rod 18 which is movable up and down and is also rotatably mounted around a vertical axis. The movement and the rotation of head 17 as well as the rotation of tool 16 are made in a way known per se which will not be described here in detail.

The head 17 is comprised of a lowermost portion the outer diameter of which is somewhat smaller than the diameter of the openings 2 and an uppermost projection which stands on the lowermost portion and the uppermost outer edge of which is bevelled. The diameter of said uppermost portion is equal to the diameter of the cylindrical opening 12 in the lowermost portion of the glass holders 7 and has a height which is exactly equal to the height of the opening 12. By means of the bevelled uppermost end of the projection of head 17 and of the widened lowermost end of the cylindrical opening 12, said projection can easily be slid inside opening 12. Cross-wise through the head 17 and through a portion of rod 18 is provided a duct 19 which connects to a device for creating a vacuum, which is part of the glass-treating machine and which has not been shown in the drawings.

The operation of the above-described device for feeding and removing glasses is as follows: a spectacle glass 20 to be treated is located by hand inside the holders 7. Said spectacle glass 20 then closes off the opening 8,9,10 in the uppermost portion of the holder and lies with the edge thereof on the rubber ring 11. Said spectacle glass 20 to be treated can be both convex and concave, but the outermost diameter thereof should be approximately equal to the diameter of the uppermost portion 8 of the opening 8,9,10. Locating of a spectacle glass 20 in a holder 7 can be made very accurately as such locating is made by hand. The disk 1 is driven intermittently by the motor 6 along the direction shown by arrow 21 in FIG. 1. The disk 1 always so stops that an opening 2 comes to lie accurately below the tool 16 and thus also exactly above the head 17 of the spectacle glass-treating machine. After a number of intermittent movements, each holder 7 then comes with the spectacle glass 20 below the tool 16. Immediately after stopping of disk 1, the head 17 on the rod 18 of the spectacle glass-treating machine goes upwards while a vacuum is produced along duct 19. The projection on the upper side of head 17 comes thereby in the opening 12 of the holder 7 and shuts said opening. Consequently the duct now communicates through the channel 13 but with the opening 8,9,10 in such a way that thus the spectacle glass 20 due to the vacuum is pulled downwards and pressed firmly against the rubber ring 11. By the further raising of head 17, the holder 7 is now further moved away from the opening 2. The head 17 can always pass completely through the opening 2. The holder 7 is so moved upwards that the spectacle glass 20 to be treated comes against the diamond tool 16 and thus the treatment occurs. After the treatment, the head 17 goes back down and thus the holder 7 is located again in the opening 2 by the further lowering of the head 17, the vacuum is also cut off as the projection on the upper side of the head 17 is slid out of the recess 12. Said treatment is followed by a new movement of the disk 1 so that a new holder 7 with a glass arranged therein in the above-described way then comes below the tool 16 and can thus be treated. The treated spectacle glass 20 is now taken out of the first-mentioned glass holder 7 and it is replaced by a new spectacle glass to be treated, while the spectacle glass in the last-mentioned new holder undergoes the treatment thereof. In this way the glass-treating machine can operate continuously without having to be stopped for putting glasses in or removing glasses therefrom. A spectacle glass is located in every holder 7 but one or two.

The device for the feeding and removal of spectacle glasses is electrically coupled in a know way to the spectacle glass-treating machine, in such a way that the disk 1 moves over a determined angle whenever between two treatments of a spectacle glass 20, the head 17 of the machine returns to the lowermost position thereof, Said electrical coupling comprises a number of microswitches which control the electric circuit in which is connected the motor 6 which drives the disk 1. Such coupling is completely within the known art and will not be further described here.

When some spectacle glass 20 is broken, it is only necessary to remove the holder 7 wherein lies said glass from the opening 2 in table 1 and to put a new holder with a spectacle glass 20 to be treated in position. The cleaning of the holder 7 can be made easily out of the feeding and removal device without having to stop thereby the glass-treating machine or the device for feeding and removing the glasses. When spectacle glasses with another diameter are to be treated, the holders 7 only are to be replaced while the disk 1 and the driving mechanism thereof can be retained. Indeed the outer dimensions of the holders 7 are always the same, the diameter of the top portion 8 and the diameter of the U-shaped groove 9 of the top portion opening of said holder 7 only being adapted to the diameter of the spectacle glass 20 to be treated. The change-over to spectacle glasses with another diameter can be made very fast with the above-described device for the feeding and removal of glasses.

It must be understood that the invention is in no way limited to the above embodiments and that many changes may be brought therein without departing from the scope of the invention as defined by the appended claims.

I claim:

1. Device for the feeding of optical glasses, particularly for spectacles, to a glass-treating machine and for the removal of said glasses therefrom, said machine comprising a tool, means for rotating said tool, a head lying thereunder which is movable up and down and rotatable about a vertical axis, and means for moving said head to and away from said tool, with a glass holder and means to bring a glass in said holder between said head and tool and away from between said head and tool, which comprises a movable support provided with openings through which the glass-treating machine head can pass partly at least, a plurality of glass holders which bear with the lower part thereof at least in the support openings, and means for moving the support intermittently in such a way that each support opening can come in sucession between the head and tool of the glass-treating machine.

2. Device as claimed in claim 1, in which the support is a disk and the means for moving intermittently said support are means for rotating intermittently said disk.

3. Device as claimed in claim 1, in which the number of openings in said support is equal to about 24.

4. Device as claimed in claim 1, in which the glass holders are removably located in the support openings.

5. Device as claimed in claim 1, in which each holder is provided on the lower side thereof with a recess inside which fits a projecting portion of the head of the glass-treating machine.

6. Device as claimed in claim 1, in which the support openings and the holders are round and each holder comprises a portion which fits accurately inside the openings and a portion of larger diameter which lies on the support upper side.

7. Device as claimed in claim 1, in which each holder is provided on the upper side with a recess wherein fits exactly a glass and which is provided with a ring-like groove wherein enters a resilient sealing ring.

8. Device as claimed in claim 1, in which each support opening is bounded by a sleeve which is mounted in said support.

* * * * *